United States Patent [19]

Anderson

[11] Patent Number: 5,607,266
[45] Date of Patent: Mar. 4, 1997

[54] SPEED REDUCER ASSEMBLY

[75] Inventor: James R. Anderson, Menominee, Mich.

[73] Assignee: Evergreel Tool Co., Inc., Menominee, Mich.

[21] Appl. No.: 439,386

[22] Filed: May 11, 1995

[51] Int. Cl.⁶ .......................... B23B 47/14; F16H 37/06
[52] U.S. Cl. ................. 408/124; 74/665 K; 408/36; 408/204; 408/241 R
[58] Field of Search ............... 408/36, 124, 204–209, 408/241 R; 74/665 K

[56] References Cited

U.S. PATENT DOCUMENTS 3,068,727  12/1962  Wertman .................................. 408/36

FOREIGN PATENT DOCUMENTS

| 538315 | 7/1941 | United Kingdom | 408/124 |
| 738048 | 10/1955 | United Kingdom | 408/206 |
| 957936 | 5/1964 | United Kingdom | 408/124 |
| 2196563 | 5/1988 | United Kingdom | 408/124 |

*Primary Examiner*—Steven C. Bishop
*Attorney, Agent, or Firm*—Michael, Best & Friedrich

[57] ABSTRACT

A speed reducer assembly for use with a power hand drill comprising a speed reducer connected to the rotating hub of the drill and having a gear arrangement including a first rotating member and a second rotating member, the second rotating at a speed slower than the first rotating member, and comprising a clamp removably positionable around the speed reducer and including a handle such that when the handle is held stationary, the speed reducer is prevented from rotating when the drill is energized.

26 Claims, 3 Drawing Sheets

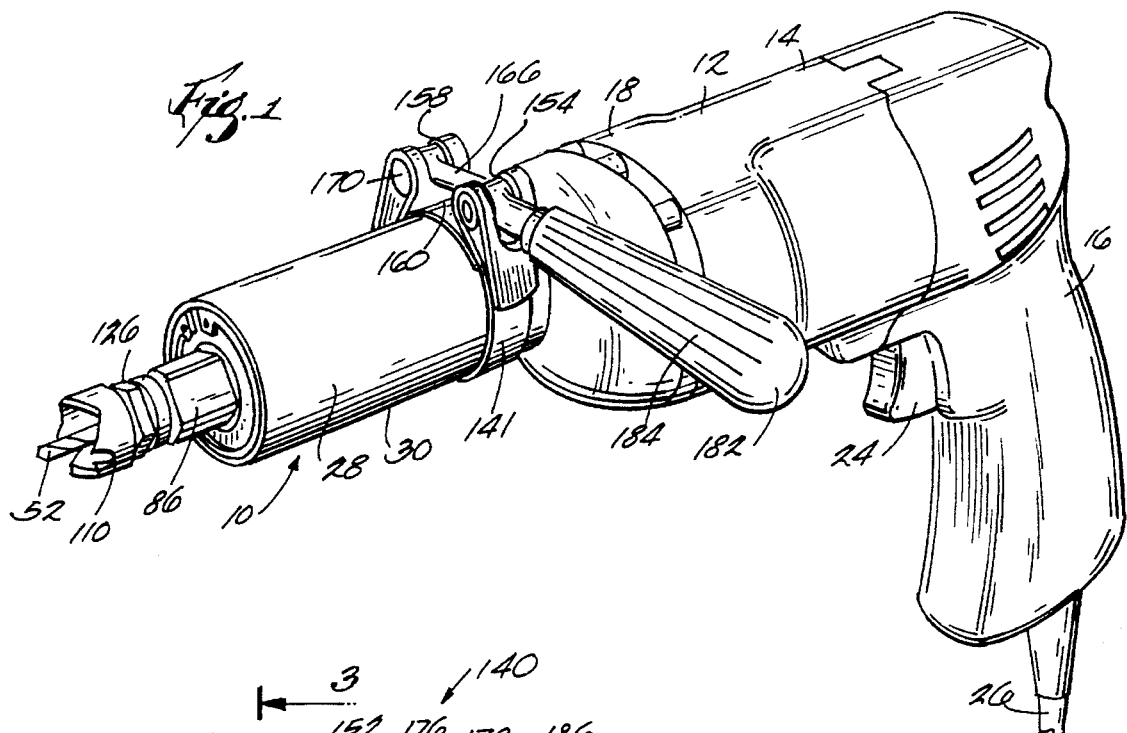
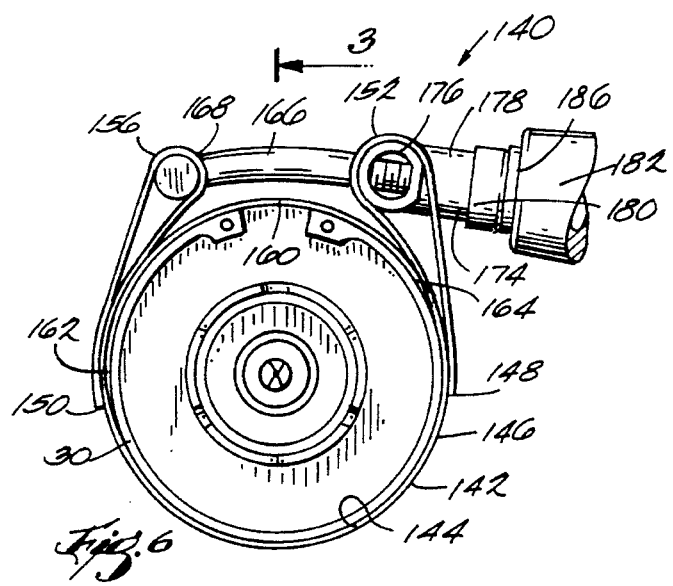
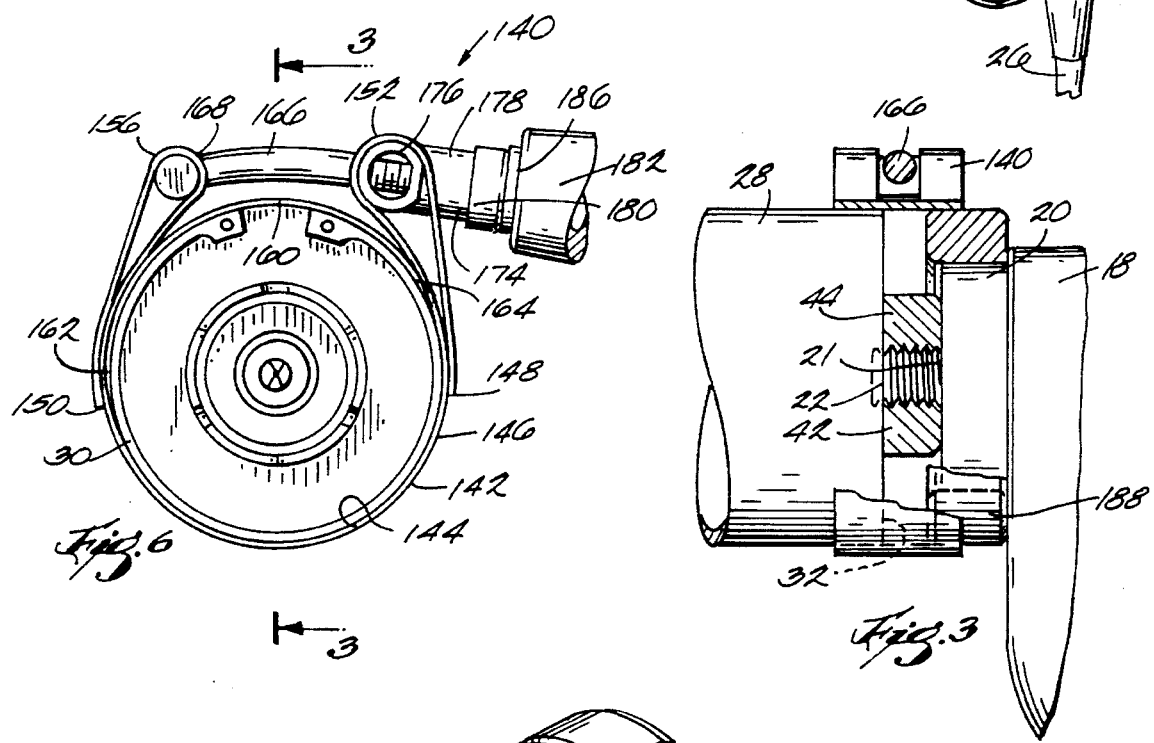
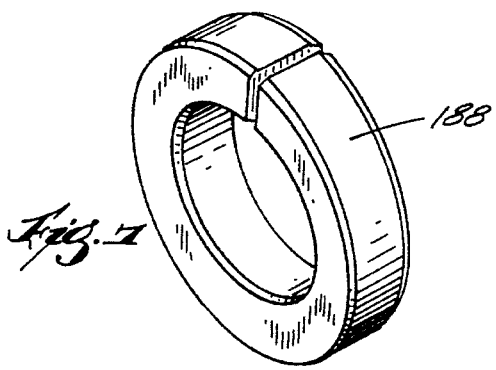

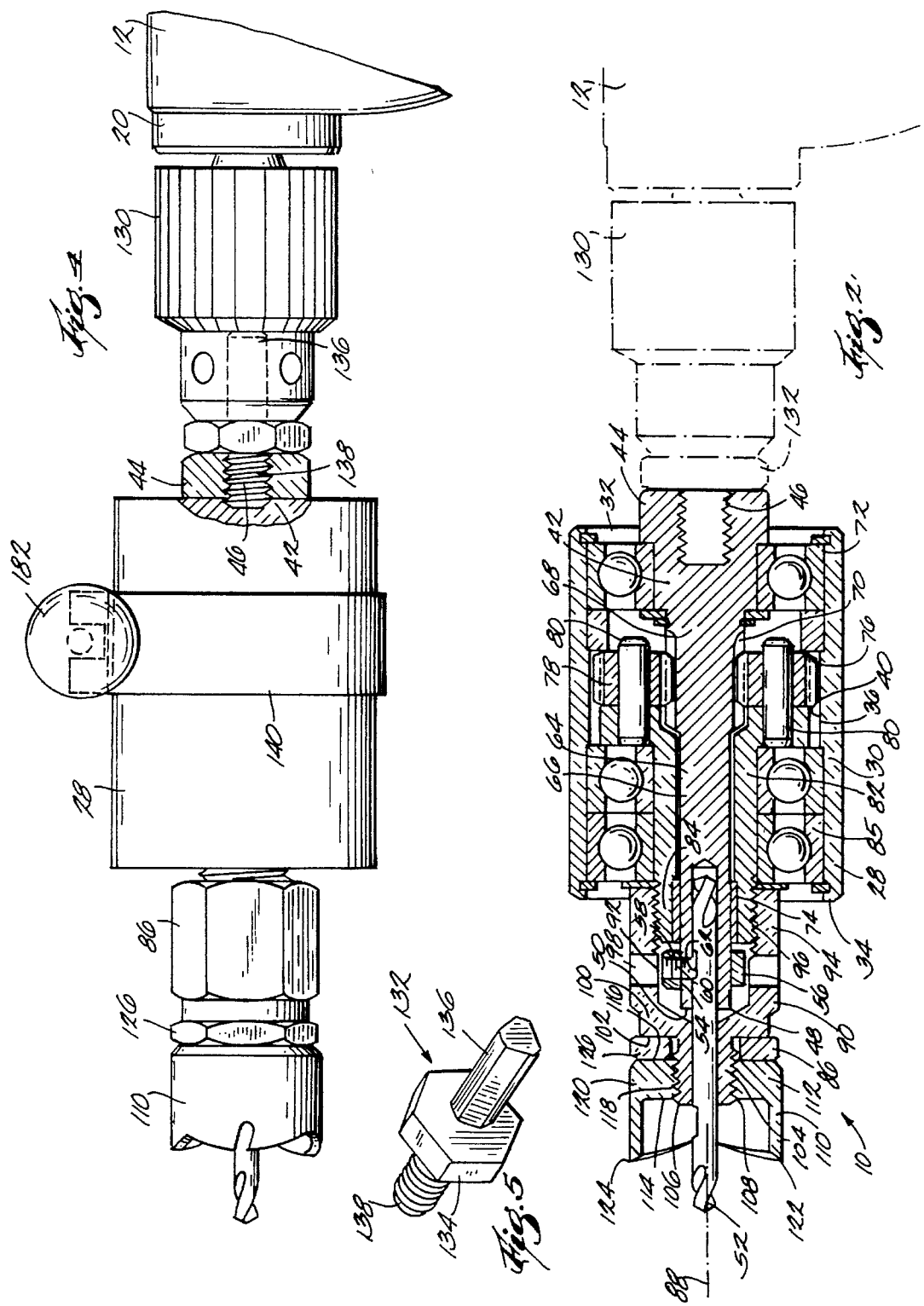

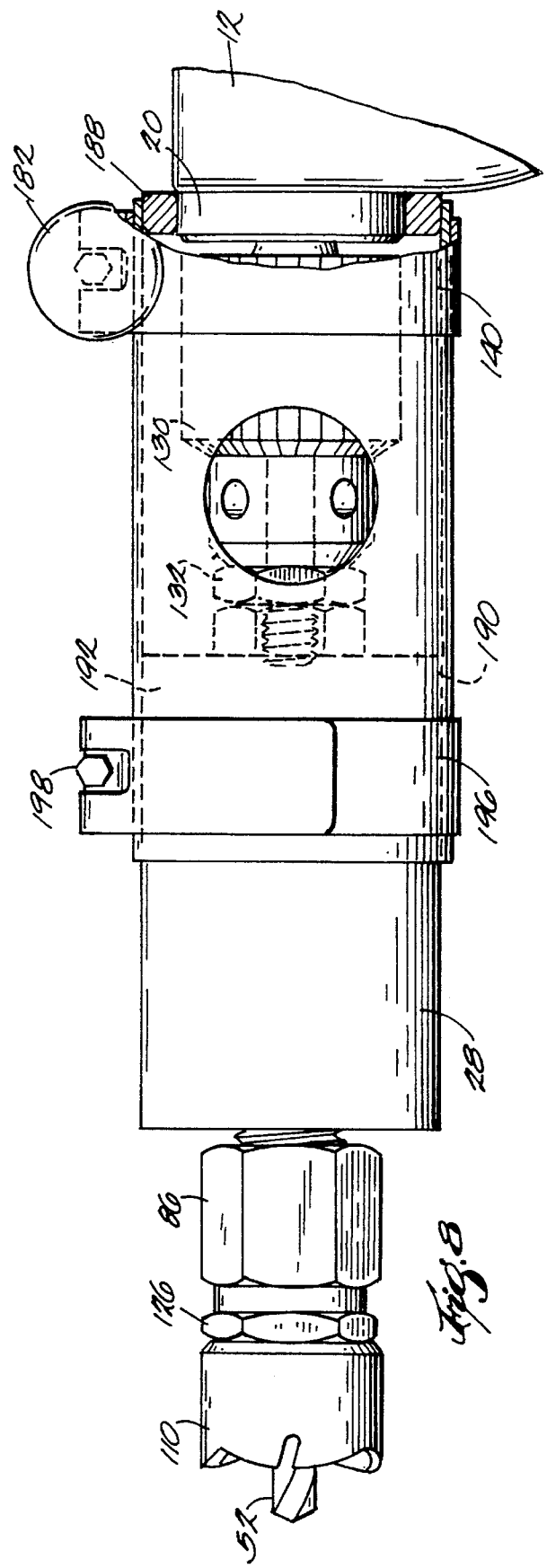

SPEED REDUCER ASSEMBLY

FIELD OF THE INVENTION

The invention relates to a speed reducer assembly for use with a power drill.

BACKGROUND OF THE INVENTION

With some materials to be drilled, it is necessary that a drill rotate a drill bit at a slow speed. For example, stainless steel is difficult to machine because of its hardness, toughness and work-hardening properties. Thus, stainless steel requires a slower cutting speed of generally 60 surface feet per minute, which is roughly one-half that of low carbon steel, to minimize friction and heat build-up when using a hole cutter to make a hole. Although variable speed power drills are available, such drills provides insufficient torque at the low speeds to drive some drill bits such as hole cutters and especially larger diameter hole cutters.

In some applications, it is necessary to use two different types of drill bits. For example, in drilling holes, often a pilot drill bit is employed along with a hole cutter. Furthermore, it is sometimes desired that the two drill bits be rotated at different speeds to best accomplished the task that the drill bits are designed to do.

SUMMARY OF THE INVENTION

The invention provides a speed reducer assembly for use with a power drill having a driven hub rotating, when the drill is energized, about an axis of rotation. The speed reducer assembly includes a speed reducer connected to the hub of the drill. The speed reducer has a generally cylindrical housing and a gear arrangement including first and second rotating output members that are co-axial. The gear arrangement is connected between the hub and the housing of the speed reducer so that when the drill is energized and the housing is stationary, the first and second output members are rotated at different speeds. The speed reducer assembly also includes a clamp having a sleeve positioned about the axis of rotation, biased toward a first circumferential expanded position, and being contractible circumferentially from the expanded position to a contracted position. A clamping member is attached to the sleeve that applies a force to the sleeve to contract the sleeve circumferentially so that the sleeve securely engages the housing of the speed reducer and prevents the housing from rotating relative to the drill. The clamp also selectively releases the force so as to expand the sleeve to its expanded position.

It is an object of the present invention to provide an improved speed reducer assembly that is securable to the output shaft of a power hand drill.

It is another object of the present invention to provide a speed reducer assembly that is secured to the chuck of a power hand drill.

It is another object of the present invention to provide a speed reducer assembly for use with a power drill that rotates one drill bit at the same speed the motor of the drill is rotating the output shaft and that rotates a second drill bit at a slower speed.

It is another object of the present invention to provide a speed reducer for use with a power drill having a planetary gear reduction arrangement.

It is another object of the present invention to provide a speed reducer assembly for use with a power drill that includes a speed reducer and a clamp that achieves the desired speed reducing motion when the drill is energized, and which clamp includes a handle to facilitate hand held operation of the speed reducer and the drill.

Other features and advantages of the invention will become apparent to those of ordinary skill in the art upon review of the following detailed description, claims, and drawings.

BRIEF DESCRIPTION OF THE DRAWINGS

FIG. 1 is a perspective view of the speed reducer assembly with a power drill embodying the invention;

FIG. 2 is a sectional view of the speed reducer assembly;

FIG. 3 is a view taken along line 3—3 of FIG. 6;

FIG. 4 is a side view of a second embodiment of the speed reducer assembly;

FIG. 5 is a perspective view of the stem adapter shown in FIG. 4;

FIG. 6 is an end view of the speed reducer assembly;

FIG. 7 is a perspective view of a collar; and

FIG. 8 is a side view of an alternative embodiment of the speed reducer assembly.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring now to the drawings, there is shown in FIG. 1 a speed reducer assembly 10 embodying the invention. The speed reducer assembly 10 is used in conjunction with a conventional variable-speed power hand drill 12. It should be noted that the invention described herein is used in conjunction with a power drill that can be used in its normal operating mode as well as adapted to be used, as described herein, in a speed reducing mode. Using one drill for both modes is both cost effective and convenient. However, it is also contemplated that a power drill permanently adapted to the speed reducing mode can also be utilized.

Continuing to refer to FIG. 1, the drill 12 includes a housing 14 having a handle portion 16. The housing 14 also includes a motor portion 18 which terminates in a shoulder 20 (FIG. 3). A conventional variable speed motor is located in the motor portion 18 of the housing 14. As is shown in FIG. 3., a hub 21 including a threaded output shaft 22 is operably connected to the motor and extends outwardly from the motor portion 18 of the housing 14 through the shoulder 20. The motor of the drill 12 rotates the output shaft 22. The drill 12 also includes a trigger 24 for starting and adjusting the speed of the motor and an electric cord 26 for connection to a power source. Alternatively, a battery powered hand drill could also be used. For normal drilling operations, a chuck is normally operably connected to the output shaft 22 and a drill bit is releasably secured to the chuck to perform the intended operation.

As best shown in FIG. 2, the assembly 10 includes speed reducer 28 having a generally cylindrical housing 30 with first and second ends 32 and 34 respectively. The housing 30 has an interior surface 36. A portion 38 of the interior surface 36 has thereon gear teeth 40.

The speed reducer 28 includes the following gear arrangement with reference to FIG. 2. A first rotating member or central shaft 42 extends the length of the housing 30 and has a first end 44 that extends outwardly beyond the first end 32 of the housing 30. The first end 44 has therein an aperture 46 that is operably connected to the output shaft 22 of the drill 12 in either of two modes as will be more fully explained. The central shaft 42 has a second end 48 that extends outwardly beyond the second end 34 of the housing 30. The second end 48 has therein a bore 50 for receiving a drill bit 52 such as the depicted double-ended pilot drill bit. The second end 48 also has an access bore 54 that communicates with the bore 50. The speed reducer 28 also includes a ring 56 having therein a bore 58 that is alignable with the bore 54 of the second end 48 of the central shaft 42. A set screw 60 is housed in both the bore 54 and the bore 58 and fixes the drill bit 52 in place by abutting a flat portion 62 of the drill bit 52. A tool such as a hex wrench is used to tighten the set screw 60 to secure the drill bit 52 or loosen the set screw 60 to remove the drill bit 52.

Continuing to refer to FIG. 2, a mid portion 64 of the central shaft 42 extends between the first and second ends 44 and 48 respectively. The mid portion 64 includes a straight section 66 and an enlarged gear section 68. The gear section 68 has thereon gear teeth 70. The speed reducer 28 includes bearings 72 and 74 which aid in the rotation of the central shaft 42. After the central shaft 42 is operably connected to the output shaft 22 of the drill 12, the central shaft 42 rotates within the housing 30 at the same speed at which the drill motor is rotating the output shaft 22. Thus, the drill bit 52 that is housed in the bore 50 at the second end 48 of the central shaft 42 is also rotating at the same speed as the central shaft 42 and output shaft 22.

The speed reducer 28 also includes a set of two planetary gears 76 and 78 that interengage with the gear section 68 of the central shaft 42 and interengage with the gear portion 38 of the interior surface 36 of the housing 30. However, it should be noted that the speed reducer 28 could also include a set of three planetary gears that interengage with the gear section 68 of the central shaft 42 and interengage with the gear portion 38 of the interior surface 36 of the housing 30. A pin 80 is fixed to a second rotating member or stub shaft 82. The planetary gears 76 and 78 rotate about the pin 80. The stub shaft 82 concentrically surrounds the central shaft 42 so as to be co-axial and terminates in an end portion 84 that extends outwardly from the second end 34 of the housing 30. The end portion 84 is threaded on its outer surface and, as will be described in a later section, is adapted to secure a drill bit. When the housing 30 of the speed reducer 28 is held stationary and the output shaft 22 of the motor rotates the central shaft 42, the planetary gears 76 and 78 rotate about the rotating central shaft 42 and, through the pins 80 and aided by bearings 85, cause the stub shaft 82 to also rotate in the same direction as the central shaft 42 yet at a slower speed.

Preferably, the planetary gears 76 and 78 are proportioned such that the stub shaft 82 rotates at one-fourth the speed of the central shaft 42, i.e., the speed reducer 28 provides a 4 to 1 gear reduction such that, assuming the motor has a speed range of 0–1000 rpm, the stub shaft 82 has a rotational speed range of 0–250 rpm. While the rotational speed of the stub shaft 82 is reduced by one-fourth, the torque available is multiplied by a factor of four. Therefore, at the reduced speed, the speed reducer 28 provides a slower speed with a sufficient torque to drive a drill bit secured to the stub shaft 82, especially the larger drill bits such as large diameter hole cutters. The reduced speed for rotation of the drill bit, especially a hole cutter, provides improved drilling performance and lengthens tool life.

To secure a drill bit to the speed reducer 28, an adapter 86 is employed. As shown in FIG. 2, the adapter 86 includes an axis of rotation 88 about which the adapter 86 is rotatable. The adapter 86 includes a body 90 having therein an aperture 92 defined by the an annular wall 94. A portion of the interior surface 96 of the wall 94 is threaded such that the threading corresponds to the threading on the stub shaft 82 of the speed reducer 28. The wall 94 has an access bore 98 that is alignable with the bore 58 of the ring 56 and the bore 54 of the central shaft 42 to enable access to the set screw 60 for securing or removing the drill bit 52. A boss 100 extends outwardly from the wall 94 and has thereon an annular shoulder 102. A shaft 104 extends outwardly from the boss 100. The shaft 104 includes threading that is preferably of the four-start type, as is more fully described in co-pending application entitled "Hole Producing Assembly", Ser. No. 08/439,307 filed May 11, 1995, incorporated herein by reference. The shaft 104 terminates in an end 106. A central bore 108 is located in the shaft 104 and the boss 100 such that a drill bit 110 is housed in the bore 108.

Continuing to refer to FIG. 2, the drill bit 110 is used that can be threaded onto the shaft 104 of the adapter 86. As shown in FIG. 2, the drill bit 110 is a hole cutter. However, it should be noted that the drill bit 110 could be any type of drill bit. The hole cutter 110 has an annular base 112 having a first surface 114 and a second surface 116. The base 112 has a central bore 118 that is defined by a cylindrical wall 120. The cylindrical wall 120 is threaded. Extending from the periphery of the base 112 in a direction away from the base 112 is an annular cutting projection 122. The cutting projection 122 terminates in a cutting edge 124. The cutting projection 122 can include any arrangement of cutting teeth. Preferably, the cutting projection includes three cutting teeth spaced equally from one another with each cutting tooth having an adjacent raker tooth as is more fully described in co-pending application entitled "Cylindrical Cutter", Ser. No. 08/439,384, filed May 11, 1995, which is incorporated herein by reference. Preferably, a spacer 126 is positioned on the shaft 104 of the adapter 86 before the drill bit 110 is threaded onto the shaft 104. The spacer 126 is annular and preferably of hexagonal shape such that the spacer 126 has at least one linear edge on its periphery. The spacer 126 has a central aperture 128 having a diameter that is slightly larger than the diameter of the shaft 104 of the adapter 86. The spacer 126 can be of varying thickness. The spacer 126 is positioned on the shaft 104 of the adapter 86 such that the spacer 126 abuts the shoulder 102. Thereafter, the drill bit 110 is threaded onto the shaft 104 and hand tightened. In this arrangement, the drill bit 52 is co-axial with the axis of rotation 88 of the adapter 86 and the drill bit 110 is concentric with the drill bit 52. The drill bit 52 aids in centering the drill bit 110 on the material to be drilled and also prevents the drill bit 110 from straying from the desired drilling position upon contact with the material.

To remove the drill bit 110 from the adapter 86, the linear edges of the spacer 126 are gripped by hand and rotated thus also loosening the drill bit 110 for removal from the shaft 104. The spacer 126 and the four-start threading of the shaft 104 make removal of the drill bit 110 from the shaft 104 easier in that less force is required to loosen the spacer 126 which in turn loosens the drill bit 110 and removal can be done by hand. Alternatively, a wrench can be used on the linear edges of the spacer 126 to loosen the spacer 126 and the drill bit 110 in order to remove the drill bit 110 from the shaft 104. The spacer 126 and the four-start threading of the shaft 104 also make removal of the drill bit 110 from the shaft 104 using a wrench easier in that less force is required to loosen the spacer 126 which in turn loosens the drill bit 110.

The speed reducer 28 can be attached to the drill 12 in one of two modes. The first mode of attaching the speed reducer 28 to a hand drill 12 is shown in FIGS. 1 and 3. In this mode, the speed reducer 28 is threaded onto the output shaft 22 by inserting the output shaft 22 into the aperture 46 on the first end 44 of the central shaft 42 and then hand tightened until it abuts the shoulder 20. If desired, a washer (not shown) can be placed on, or left on as the case may be, the output shaft 22 before the speed reducer 28 is threaded onto the output shaft 22. The second mode of attaching the speed reducer 28 to the hand drill 12 uses the chuck 130 of the drill 12 as shown in FIGS. 2 and 4. The normally-used chuck 130 of the drill 12 is not removed as it with the first mode of attaching the speed reducer 28 to the drill 12. An advantage of this mode is that the speed reducer 28 can be quickly secured to and removed from the drill chuck 130 like an other drill bit. In this mode, a stem adapter 132 as best shown in FIG. 5 is employed. The stem adapter 132 has a body portion 134 that is preferably hexagonal shaped. Extending outwardly from the body portion 134 is a shaft 136 that is adapted to be positioned and secured in the drill chuck 130. A threaded shaft 138 extends outwardly from the other end of body portion 134.

Referring to FIGS. 2 and 4, to install the speed reducer 28, the threaded shaft 138 of the stem adapter 132 is threaded into the aperture 46 of the central shaft 42 until the body portion 134 abuts the speed reducer 28. Thereafter, the shaft 136 of the stem adapter 132 can be positioned and secured in the chuck 130 of the drill 12 like any other drill bit.

Due to the planetary gear reduction system of the speed reducer 28, it is necessary to prevent the speed reducer housing 30 from rotating in order to achieve the desired gear reduction. To this end, a clamp 140 is used that surrounds the housing 30 of the speed reducer 28 and prevents the housing 30 from rotating. The clamp 140 is shown in FIGS. 1, 3 and 6. The clamp 140 circumferentially surrounds the housing 30 and is moveable between a first or contracted position in which the clamp 140 securely engages the housing 30 and a second or expanded position in which the clamp 140 is freely moveable along the housing 30.

Specifically, with reference to FIG. 6, the clamp 140 includes a sleeve 141 that surrounds the housing 30. The sleeve 141 includes a band 142 having an interior surface 144, an exterior surface 146, a first end 148 and a second end 150. A portion of the band 142 including the first end 148 is turned back on itself to form a first loop 152. The first loop 152 has therein a central slot 154 (FIG. 1). The first end 148 is secured to the exterior surface 146 of the band 142 in any manner such as by welding. Similarly, a portion of the band 142 including the second end 150 is turned back on itself for form a second loop 156. The second loop 156 also has therein a central slot 158 (FIG. 1). The second end 150 is secured to the exterior surface 146 of the band 142 in any manner such as by welding. Preferably, although not necessary, the sleeve 141 also includes a second shorter band 160 having first and second ends 162 and 164 respectively. The first end 162 is secured to the interior 144 of the band 142 in any manner such as by welding and is secured near the second loop 156. The second band 160 extends along an arcuate path between the first loop 152 and the second loop 156. The second end 164 of the second band 160 abuts the interior 144 of the band 142 near the first loop 152 yet is not secured to the band 142. Thus, the first and second bands 142 and 160 cooperate to form the sleeve 141 that circumferentially surrounds the generally cylindrical housing 30 of the speed reducer 28. The circumference of the sleeve 141 is changeable, as will be described hereafter, so that the sleeve 141 can assume contracted and expandable positions.

The clamp 140 also includes a shank 166 having a first end 168 and a second end (not shown). As best shown in FIG. 1, the first end 168 of the shank 166 includes a cross member 170 that is positioned in the second loop 156. In this position, the shank 166 extends outwardly from the second loop 156 through the slot 154. The shank 166 is threaded. The entire shank 166 can be threaded or, as shown in FIG. 6, the shank 166 can be threaded from a position near the second loop 156 and continuing to the second end of the shank 166.

Continuing to refer to FIG. 6, the clamp 140 also includes a clamping member or anchor 174 that cooperates with the shank 166. The anchor 174 is preferably T-shaped having a first member 176 and a second member 178. The first member 176 is hollow and is positioned in the first loop 152 of the band 142. The second member 178 is transverse relative to and integral with the first member 176 and is also hollow. The second member 178 extends outwardly from the slot 154 in the first loop 152 and houses a portion of the shank 166 in its interior. The second member 178 terminates in cap 180.

The clamp 140 also includes a threaded member or elongate handle 182 which extends laterally from the sleeve 141 and which cooperates with the shank 166 and the anchor 174. The handle 182 has longitudinal grooves 184 on its exterior surface to facilitate gripping and rotation of the handle 182. Extending inwardly from an end 186 of the handle is a threaded bore (not shown). The handle 182 is threaded onto the second end of the shank 166 by clockwise rotation of the handle 182 until the end 186 of the handle 182 abuts the cap 180 of the second member 178 of the anchor 174. In this orientation, the handle 182 is moveable relative to the shank 166. With the handle 182 threadably connected to the shank and abutting the cap 180, further clockwise rotation of the handle 182 moves the anchor 174 and first loop 152 along the shank 166 in a direction towards the second loop 156 such that the circumference of the sleeve 141 is reduced because the first loop 152 and second loop 156 are closer to each other. Rotation of the handle 182 counter clockwise, moves the anchor 174 and first loop 152, via the biasing action of the sleeve 141, along the shank 166 further away from the second loop 156 such that the circumference of the sleeve 141 is increased because the first loop 152 and second loop 156 are further away from each other. Thus, rotation of the handle 182 in one direction contracts the circumference of the sleeve 141 while rotation of the handle 182 in the opposite direction expands the circumference of the sleeve 141.

Referring to FIG. 1, to use the clamp 140, the handle 182 is rotated counterclockwise until the circumference of the sleeve 141 is greater than the circumference of the housing 30 of the speed reducer 28. The clamp 140 is then slid onto the speed reducer 28 such that the sleeve 141 surrounds a portion of the housing 30. Thereafter, the handle 182 is rotated clockwise to reduce the circumference of the sleeve 141 until the sleeve 141 tightly surrounds the housing 30 of the speed reducer 28 so that the clamp 140 cannot be slide axially along the housing 30. When the drill 12 is in use, the operator grips the handle 16 of the drill 12 with one hand to operate the trigger 24 and grips the handle 182 of the clamp 140 with the other hand to therefore prevent the housing 30 of the speed reducer 28 from rotating. It should be noted that the handle 182 of the clamp 140 can be positioned anywhere along the circumference of the speed reducer 28 to accommodate the comfort of the operator.

Referring to FIG. 3, when the speed reducer 28 is attached to the drill 12 in the first mode, preferably a collar 188 is used such that the sleeve 141 is positioned over both the collar 188 and the speed reducer 28. Specifically, the collar 188 is shown in FIG. 7. The collar 188 is an annular slotted ring that is dimensioned to surround the shoulder 20 of the drill 12 in a friction fit. The outer diameter of the collar 188 preferably is the same as the outer diameter of the housing 30 of the speed reducer 28 so that the sleeve 141 can tightly surround both a portion of the collar 188 and a portion of the speed reducer 28. The use of such collar 188 provides for both prevention of the speed reducer housing 30 from rotating and a more stable securing of the speed reducer 28 to the drill 12.

Referring to FIG. 4, when the speed reducer 28 is attached to the drill 12 in the second mode, the clamp 140 is used as previously described with respect to the first mode, to removably surround the housing 30 of the speed reducer 28.

Referring now to FIG. 8, there is shown the speed reducer 28 attached to the drill 12 in the second mode, the collar 188 surrounds the shoulder 20 of the housing 18 of the drill 12, and a second embodiment of a clamp 190. The clamp 190 is similar to the clamp 140, however, the clamp 190 includes a sleeve 192 having a longer axial length so as to be able to surround both a portion of the housing 30 of the speed reducer 28 and the collar 188 which have the drill chuck 130 in between them.

Specifically, the clamp 190 includes the elongate sleeve 192 formed by an elongate body portion 194 terminating in first and second ends (not shown) that overlap so as to be moveable relative to each other to assume the expanded and contracted positions of the sleeve 192. Surrounding one end of the sleeve 192 is a clamp 140 as previously described. It should be noted that the same clamp 140 can be used solely as shown in FIG. 1 or used as a part of the clamp 190 as shown in FIG. 8. Surrounding the other end of the sleeve 192 is a clamp 196 similar to clamp 140, however, the clamp 196 does not have a handle. In its place, the clamp 196 has a nut 198 that can be rotated.

Continuing to refer to FIG. 8, to secure the clamp 190, the handle 182 of the clamp 140 and the nut 198 of the clamp 196 are rotated to allow the circumference of the sleeve 192 to be greater than the circumference of the housing 30 of the speed reducer 28. The clamp 190 is then slide over the speed reducer 28 and positioned so that it surround the collar 188 and a portion of the housing 30 of the speed reducer 28. The handle 182 of the clamp 140 is then tightened as previously described to secure one end of the clamp 190 to collar 188. Thereafter, the nut 198 on the clamp 196 is tightened to secure to other end of the clamp 190 to the housing 30 of the speed reducer.

After the speed reducer 28 has been secured to the drill 12 by any of the above methods and prevented from rotating by one of the clamps 140 or 190, the operator can use the drill 12 for the intended operation of the drill bits 52 and 110. The operator can operate the motor at full speed (1000 rpm) or at a slower speed depending upon the operation to be performed. During use, the drill bit 52 will rotate at the same speed the motor is rotating the output shaft 22 while the drill bit 110 will rotate at a reduced speed.

We claim:

1. A speed reducer assembly for use with a power drill having a driven hub rotating, when said drill is energized, about an axis of rotation, said assembly comprising:

a speed reducer connected to the hub, said speed reducer having a generally cylindrical housing and a gear arrangement including first and second rotating output members, said first and second rotating output members being co-axial, said gear arrangement being connected between the hub and said housing of said speed reducer so that when the drill is energized and said speed reducer is held stationary, said first and second rotating output members are rotated at different speeds; and a clamp including a sleeve surrounding said housing of said speed reducer, biased toward a first circumferential expanded position, and being contractible circumferentially from said expanded position to a contracted position, said clamp also including a clamping member attached to said sleeve for applying a force to said sleeve to contract said sleeve circumferentially so that said sleeve securely engages said housing of said speed reducer and prevents said housing from rotating relative to the drill, said clamping member also selectively releases said force so as to expand said sleeve to said expanded position.

2. A speed reducer assembly as set forth in claim 1 wherein said clamp includes an elongated handle projecting laterally from said sleeve.

3. A speed reducer assembly as set forth in claim 1 wherein said clamp includes a first anchor attached to said sleeve adjacent one of said edge portions, a second anchor adjacent the other of said edge portions, a shank attached to said first anchor and passing through said second anchor, a threaded member having a threaded connection to said shank and abutting said second anchor, said threaded member urging said sleeve to contract against bias to said contracted position in one direction of threaded movement and releasing sleeve for expansion to said expanded position in response to an opposite direction of threaded movement.

4. A speed reducer assembly as set forth in claim 3 wherein said threaded member includes a handle and said threaded movement of said threaded member is produced by rotation of said handle.

5. A speed reducer assembly as set forth in claim 1 wherein said assembly further includes a collar surrounding the hub of the drill, and wherein said sleeve surrounds both said housing of said speed reducer and said collar.

6. A speed reducer assembly as set forth in claim 5 wherein said sleeve comprises an elongated body portion terminating in two edge portions, said body portion bent to define said sleeve and said edge portions being movable relative to each other to assume alternatively said expanded and contracted positions.

7. A speed reducer assembly for use with at least one drill bit, a drill having a motor with a rotating output shaft and a housing, said assembly comprising:

a speed reducer having a housing and being securable to the output shaft of the drill, said speed reducer including a gear arrangement including first and second rotating members, said second rotating member being adapted to removably receive the drill bit, said gear arrangement operationally connecting said first and second rotating members such that when the drill is energized and said housing of said speed reducer is stationary, said second rotating member rotates at a slower speed than said first rotating member; and a clamp removably positionable around said housing of said speed reducer and including a handle such that when said handle is held stationary, said clamp prevents said housing of said speed reducer from rotating when the drill is energized.

8. A speed reducer assembly as set forth in claim 7 wherein said first rotating member rotates at the same speed at which the motor, when energized, rotates the output shaft.

9. A speed reducer assembly as set forth in claim 7 wherein said first rotating member has therein a bore adapted to removably receive a second drill bit.

10. A speed reducer assembly as set forth in claim 7 and further including a collar securable to the housing of the drill, wherein said clamp is removably positionable around said housing of said speed reducer and said collar.

11. A speed reducer assembly as set forth in claim 7 and further including an adapter threadably interengageable with said second rotating member and wherein the drill bit is removably secured to said adapter.

12. A speed reducer assembly as set forth in claim 7 wherein said speed reducer has therein an aperture and wherein said speed reducer is secured to the output shaft of the motor by placement of the output shaft in said aperture.

13. A speed reducer assembly as set forth in claim 7 wherein said clamp is moveable between a first position in which said clamp securely engages said housing of said speed reducer and a second position in which said clamp is freely moveable along said housing of said speed reducer.

14. A speed reducer assembly as set forth in claim 13 wherein said handle of said clamp is rotatable such that rotation of said handle in one direction moves said clamp to said first position and rotation of said handle in the opposite direction moves said clamp to said second position.

15. A speed reducer assembly as set forth in claim 12 wherein said aperture is in said first rotating member.

16. A speed reducer assembly for use with at least one drill bit, a drill having a motor with a rotatable hub, a chuck connected to the hub and a motor housing, said assembly comprising:

an adapter including a threaded stub and a shaft, said shaft is adapted to be removably securable in the chuck of the drill;

a speed reducer having a housing and first and second ends, said first end being threadably interengageable with said stub of said adapter, said speed reducer including a gear arrangement including first and second co-axial rotating members, said gear arrangement operational connecting said first and second rotating members such that when the drill is energized and said housing is stationary, said first and second rotating members are rotated at different speeds; and a hand clamp including a sleeve, a clamping mechanism attached to said sleeve, and a handle attached to said clamping mechanism, said sleeve surrounding said housing of said speed reducer and being moveable by said clamping mechanism between a first position wherein said sleeve is freely movable along said housing of said speed reducer and a second position wherein said sleeve securely engages said housing of said speed reducer so that when said handle is stationary, said housing is also stationary.

17. A speed reducer assembly as set forth in claim 16 and further including a collar that is securable to the motor housing of the drill, and wherein said sleeve surrounds both said collar and said housing of said speed reducer.

18. A speed reducer assembly as set forth in claim 16 wherein said first rotating member rotates at the same speed at which the motor, when energized, rotates the hub and the chuck.

19. A speed reducer assembly as set forth in claim 16 wherein said second rotating member has therein an aperture adapted to removably secure the drill bit.

20. A speed reducer assembly as set forth in claim 19 wherein said first rotating member has therein an aperture adapted to removably secure a second drill bit.

21. A speed reducer assembly as set forth in claim 16 wherein rotation of said handle in one direction causes said clamping mechanism to move said sleeve to said first position and rotation of said handle in the other direction causes said clamping mechanism to move said sleeve to said second position.

22. A hole cutting adapter for use with a power hand drill having a motor, a rotating hub attached to the motor, and a housing surrounding the hub, said adapter comprising:

a collar adapted to surround the housing of the drill;

a speed reducer connected to the hub of the drill, said speed reducer having a housing, a first rotatable member, a second rotatable member, and means for rotating said first rotatable member at the same speed the motor rotates the hub and for rotating said second rotatable member at a speed slower than said first rotatable member is being rotating;

a drill bit secured to said first rotatable member;

a hole cutter secured to said second rotatable member; and a clamp removably positionable around said housing of said speed reducer and said collar and including a handle such that when said handle is held stationary, said clamp prevents said housing of said speed reducer from rotating when the drill is energized.

23. A hole cutter adapter as set forth in claim 22 wherein said clamp is moveable between a first position wherein said clamp securely engages said housing of said speed reducer and a second position wherein said clamp is freely moveable along said housing of said speed reducer.

24. A speed reducer assembly as set forth in claim 23 wherein said handle of said clamp is rotatable such that rotation of said handle in one direction moves said clamp to said first position and rotation of said handle in the opposite direction moves said clamp to said second position.

25. A speed reducer assembly as set forth in claim 1 wherein said housing has a longitudinal axis and wherein said housing is adapted so that when said speed reducer is connected to the hub said longitudinal axis is co-axial with the axis of rotation of the hub.

26. A speed reducer assembly as set forth in claim 7 wherein said housing of said speed reducer has a longitudinal axis and wherein when said speed reducer is secured to the output shaft, said longitudinal axis is co-axial with an axis of rotation of the output shaft.

* * * * *